(12) United States Patent
Cressoni

(10) Patent No.: US 9,173,345 B2
(45) Date of Patent: Nov. 3, 2015

(54) FOLDING HEADS FOR CORN-SHELLING MACHINES AND COMBINE HARVESTERS

(71) Applicant: F.LLI CRESSONI S.p.A., Volta Mantovana (IT)

(72) Inventor: Romano Cressoni, Mantova (IT)

(73) Assignee: F.LLI CRESSONI S.p.A., Volta Mantovana, MN (IT)

( * ) Notice: Subject to any disclaimer, the term of this patent is extended or adjusted under 35 U.S.C. 154(b) by 139 days.

(21) Appl. No.: 13/955,031

(22) Filed: Jul. 31, 2013

(65) Prior Publication Data

US 2014/0033670 A1   Feb. 6, 2014

(30) Foreign Application Priority Data

Aug. 6, 2012   (IT) .............................. PD2012A0242

(51) Int. Cl.
*A01D 45/02*   (2006.01)
*A01D 41/14*   (2006.01)

(52) U.S. Cl.
CPC ............ *A01D 45/021* (2013.01); *A01D 41/144* (2013.01)

(58) Field of Classification Search
CPC ... A01D 41/144; A01D 45/021; A01D 41/14; A01D 34/246; A01D 43/082; A01D 75/002
USPC ..................................... 56/228, 103, 51, 119
See application file for complete search history.

(56) References Cited

U.S. PATENT DOCUMENTS

| | | | | |
|---|---|---|---|---|
| 3,258,901 | A | * | 7/1966 | Van Der Lely et al. ......... 56/228 |
| 3,262,254 | A | * | 7/1966 | Van Der Lely et al. ............. 56/6 |
| 3,345,808 | A | * | 10/1967 | Van Der Lely ............ 56/10.2 R |
| 3,468,107 | A | * | 9/1969 | Van Der Lely ................ 56/11.9 |
| 3,540,195 | A | * | 11/1970 | Van Der Lely ................ 56/10.7 |
| 3,683,601 | A | * | 8/1972 | Van der Lely ...................... 56/6 |
| 4,316,511 | A | * | 2/1982 | Andersen ....................... 172/776 |
| 4,409,780 | A | * | 10/1983 | Beougher et al. ............... 56/228 |
| 4,487,004 | A | * | 12/1984 | Kejr ............................... 56/14.4 |
| 4,903,470 | A | * | 2/1990 | Hemker et al. ................. 56/228 |
| 5,673,543 | A | * | 10/1997 | Richardson et al. ............. 56/85 |
| 5,724,798 | A | * | 3/1998 | Stefl et al. ....................... 56/119 |
| 5,845,472 | A | * | 12/1998 | Arnold ............................. 56/94 |

(Continued)

FOREIGN PATENT DOCUMENTS

| | | |
|---|---|---|
| DE | 3828293 C1 | 1/1990 |
| EP | 0131853 A1 | 1/1985 |

(Continued)

*Primary Examiner* — Arpád Fábián-Kovács
(74) *Attorney, Agent, or Firm* — Robert E. Alderson, Jr.

(57) ABSTRACT

Folding heads for corn-shelling machines and/or combine harvesters which include a central portion extending along a main transversal direction and two lateral portions aligned with the central portion in a working condition of the head are provided. Folding heads may include drive elements for moving the lateral portions so as to pass from the working configuration to a folded configuration wherein the lateral portions are at least partially folded and overlapping the central portion. Each lateral portion may be operatively connected to the central portion by connection elements which may include a relative arm which connects each lateral portion to the central portion, wherein the connection elements include a first hinge defining a first rotation axis parallel to a longitudinal direction of advancement of the head and a second hinge defining a second rotation axis, perpendicular to the first rotation axis. Methods of making and using folding heads are also provided.

12 Claims, 7 Drawing Sheets

(56) References Cited

U.S. PATENT DOCUMENTS

| | | | |
|---|---|---|---|
| 5,911,625 A * | 6/1999 | von Allworden | 460/119 |
| 5,960,618 A * | 10/1999 | Kerber | 56/119 |
| 7,043,889 B2 * | 5/2006 | Rauch | 56/15.9 |
| 7,360,351 B2 * | 4/2008 | Rickert et al. | 56/228 |
| 7,404,283 B2 * | 7/2008 | Viaud | 56/228 |
| 2002/0035826 A1 * | 3/2002 | Albinger et al. | 56/109 |
| 2003/0041579 A1 * | 3/2003 | Wuebbels et al. | 56/15.2 |
| 2003/0182912 A1 * | 10/2003 | Boll | 56/14.7 |
| 2003/0226342 A1 * | 12/2003 | Boeckmann et al. | 56/14.7 |
| 2004/0123575 A1 * | 7/2004 | Rickert | 56/14.7 |
| 2005/0109001 A1 * | 5/2005 | Wolters et al. | 56/16.4 R |
| 2007/0204583 A1 * | 9/2007 | Coers | 56/14.4 |
| 2008/0072560 A1 * | 3/2008 | Talbot | 56/208 |
| 2008/0295473 A1 * | 12/2008 | Tippery et al. | 56/14.5 |

FOREIGN PATENT DOCUMENTS

| | | |
|---|---|---|
| EP | 0750833 A1 | 1/1997 |
| EP | 1051895 A2 | 11/2000 |
| EP | 1932416 A1 | 6/2008 |

* cited by examiner

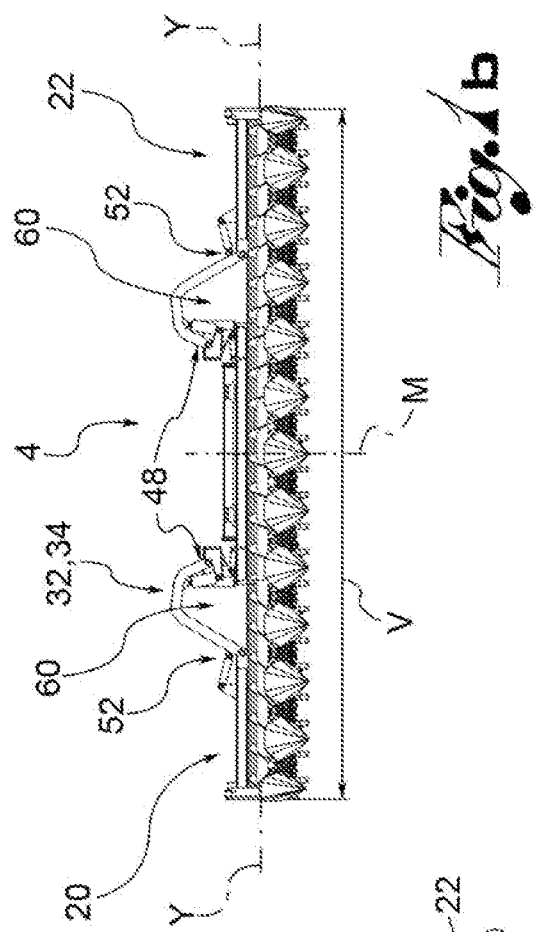
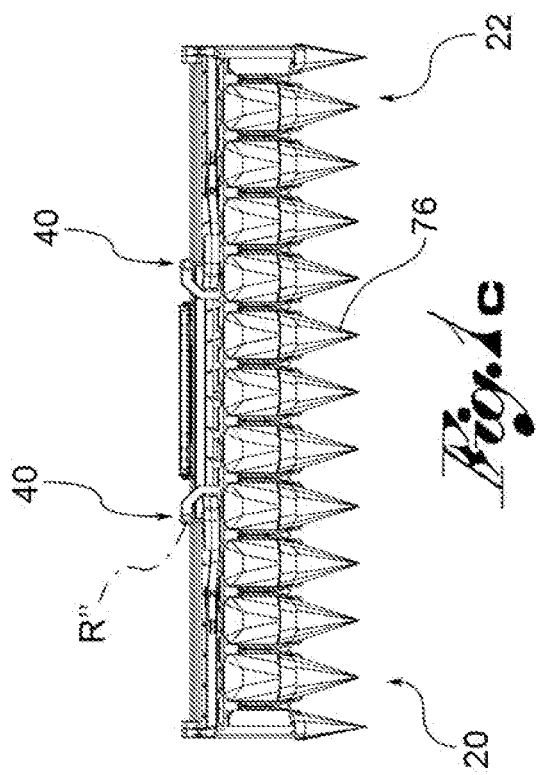
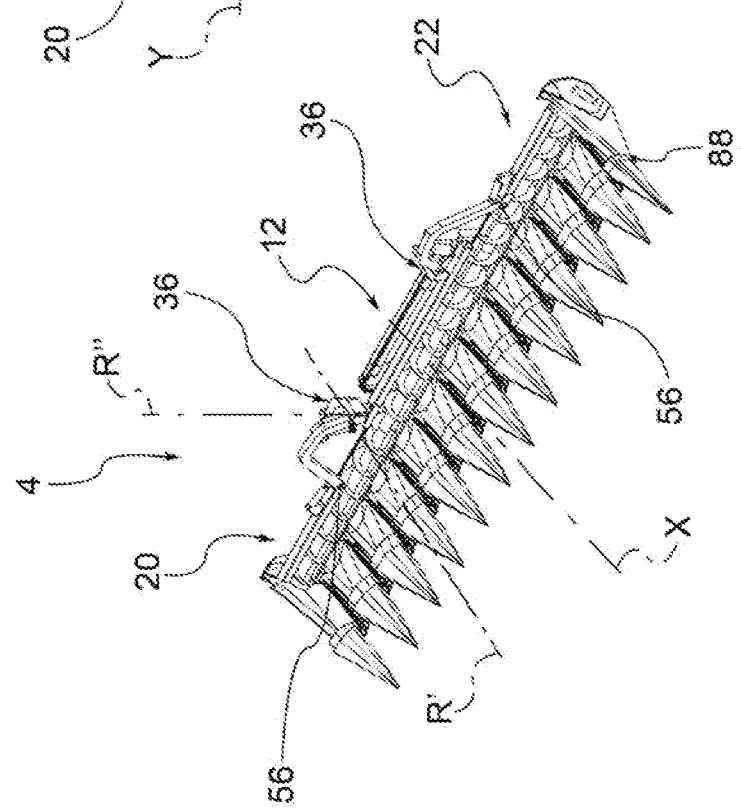

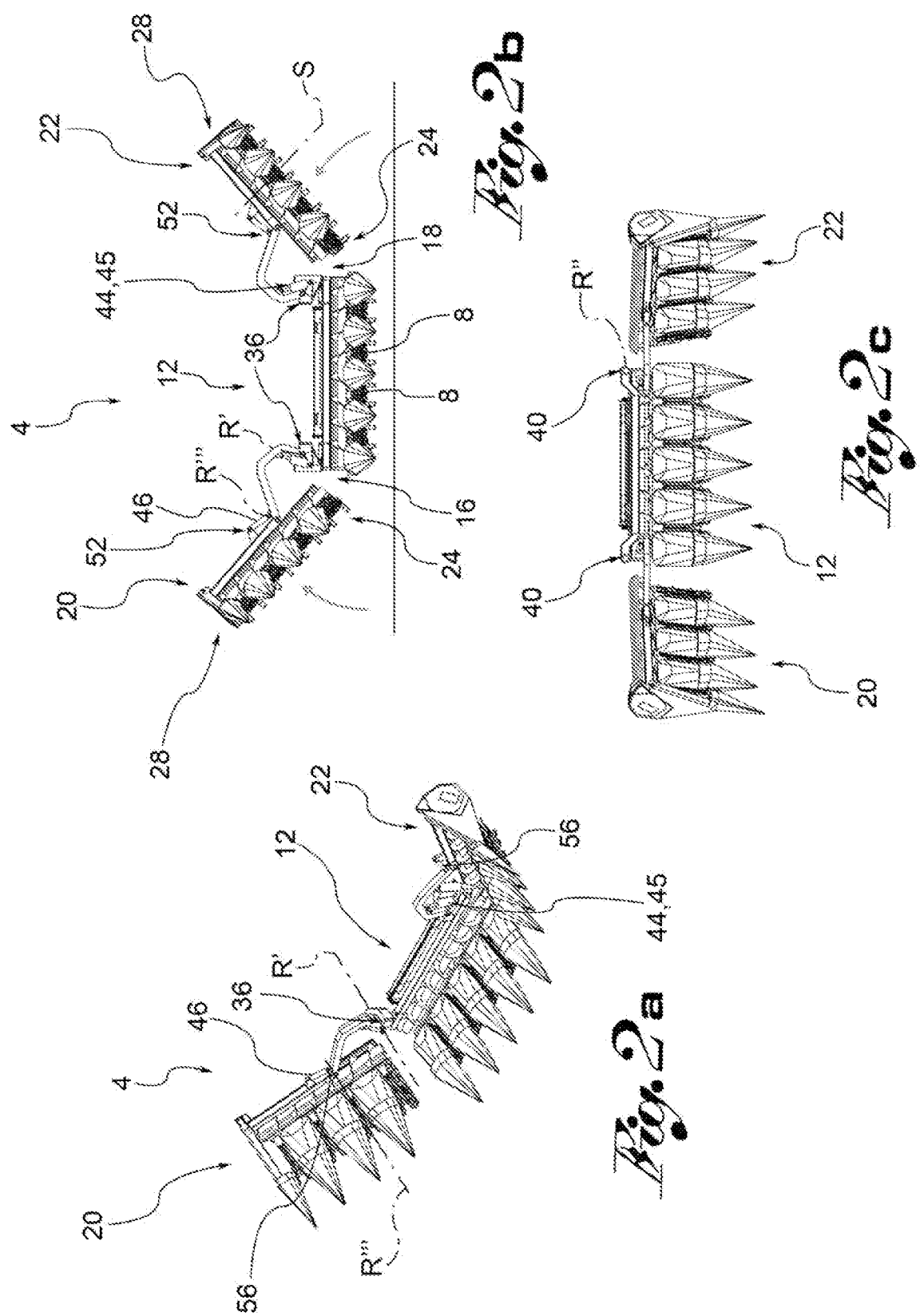

FOLDING HEADS FOR CORN-SHELLING MACHINES AND COMBINE HARVESTERS

CROSS-REFERENCE TO RELATED APPLICATION

This application claims priority to and benefit of Italian Patent Application No. PD2012A000242 filed Aug. 6, 2012, the contents of which are incorporated by reference in their entirety.

FIELD OF THE INVENTION

The present invention relates to folding heads for corn-shelling machines and/or combine harvesters suitable for performing detachment or shelling of cobs of the relative stem or stalk of cob plants. The present invention also relates to methods of folding back heads of corn-shelling machines and/or combine harvesters.

BACKGROUND OF THE INVENTION

Heads for corn-shelling machines are typically placed at the front end of a corn-shelling machine and/or combine harvester and are provided with a plurality of devices suitable for carrying out the shelling of cobs.

Such heads usually have considerable transversal dimensions, i.e. perpendicular to the advancement direction of a corn-shelling machine and/or combine harvester in order to harvest as many cobs as possible upon each passage.

Such transversal dimensions may exceed 10 meters. The heads often need to be removed from the machine and carried, for example, by means of a combine harvester. In order to be carried on combine harvesters, it is necessary to be able to fold said heads.

Solutions for the folding of heads for corn-shelling machines and/or combine harvesters are known in the art, wherein the head includes a central portion and two lateral portions hinged at opposite sides to the central portion. The hinge axes are arranged parallel to the advancement direction of the head. The central portion has an extension equal to about half the total transversal extension of the head while each lateral portion has a transversal extension equal to about ¼ of the total extension. In this way, each lateral portion can be upturned on top of the central portion and in a folded configuration, the head takes on a transversal size equal to about half the maximum size in a working configuration.

However, such solutions have limitations since the total dimensions are still equal to about half the maximum ones: this means that for larger heads, such dimensions in a folded configuration will still be approximately 5-6 m. Such dimensions are excessive and require the use of oversized loads with security risks and high transportation costs.

SUMMARY OF THE INVENTION

An object of the present invention is to provide heads for corn-shelling machines and/or combine harvesters which address the drawbacks of the prior art.

The present invention also provides heads for corn-shelling machines and/or combine harvesters which, in a folded configuration, have significantly reduced dimensions so as to be easily coupled to a combine harvester such that it falls within the combine harvester profile thus eliminating the use of oversized loads; at the same time, such heads must be reliable without impairing the functions of cob harvesting 15 when in a working configuration.

Such objects are achieved by heads for corn-shelling machines and/or combine harvesters as described and claimed herein.

Further features and the advantages of the present invention will appear more clearly from the following description of preferred non-limiting embodiments with reference to the Figures briefly described immediately below.

BRIEF DESCRIPTION OF THE FIGURES

FIGS. 1a-1c, respectively, show a perspective, front and top plan view of a corn-shelling machine and/or combine harvester according to embodiments of the present invention, said machine being in an operating condition.

FIGS. 2a-2c, respectively, show a perspective, front and top plan view of a corn-shelling machine and/or combine harvester according to embodiments of the present invention, said machine being in a folded position.

DETAILED DESCRIPTION

Figure 3B:
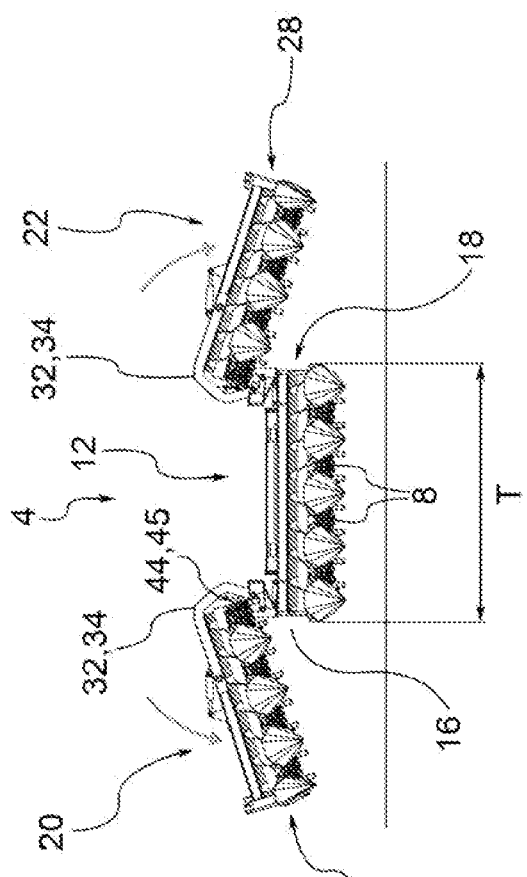
FIGS. 3a-3c, respectively, show a perspective, front and top plan view of a corn-shelling machine and/or combine harvester according to embodiments of the present invention, said machine being in a further folded position.

Elements or parts of elements in common between embodiments described below are referred to with the same reference numerals.

With reference to the above figures, reference numeral 4 globally denotes a head for a corn-shelling machine and/or combine harvester suitable for performing the shelling of cobs.

The corn-shelling machine and/or combine harvester includes head 4 which may be associated with a drive which has the function of carrying the head, moving and operating it, and conveying and harvesting the cobs as they are shelled.

Head 4 may include at least one pair of sheller rollers 8 which are counter-rotating in relation to the relative rotation axes and fitted with blades (not shown) for pulling the stack of a corn on the cob plant downwards; the rotation of the sheller rollers 8 therefore is configured to cause such downward movement or shelling of the cobs.

According to certain embodiments, head 4 also may be fitted with sheller plates, arranged on top of sheller rollers, opposite to the ground, so as to oppose resistance to the passage of the cob. In this way, the cob is torn from the stalk.

Head 4 for a corn-shelling machine and/or combine harvester may extend along a main transversal direction Y-Y, perpendicular to a longitudinal advancement direction X-X of head 4 in the working or operating step.

Head 4 may include a central portion 12 which extends along the main transversal direction Y-Y between opposite transversal ends 16, 18 and two lateral portions 20, 22 positioned on opposite sides to the central portion 12 at each transversal end 16, 18 and aligned with the central portion 12 in a working condition of head 4.

In certain embodiments, the lateral portions 20, 22 may be equal to each other and arranged on opposite sides relative to the central portion 12.

Each lateral portion 20, 22 may extend from an inner end 24, alongside the corresponding transversal end 16, 18 of the central portion 12 in a working configuration, to an external end 28, opposite the inner end 24 in relation to the transversal direction Y-Y, in a working configuration.

Each lateral portion 20, 22 may be operatively connected to the central portion 12 by the interposition of connection elements 32 which may include a relative arm 34 which connects each lateral portion 20, 22 to the central portion 12.

In particular, the connection elements 32 may include a first hinge 36 defining a first rotation axis R' parallel to the longitudinal direction X-X of advancement of the head 4, so as to separate and raise the lateral portions 20, 22 in relation to the central portion 12, and may include a second hinge 40 defining a second rotation axis R", perpendicular to the first rotation axis R', so as to rotate the lateral portions 20, 22 in reciprocal approach towards a centerline plane M-M of the central portion 12 and to position them on a plane substantially perpendicular to said transversal direction Y-Y.

The head 4 may further include drive elements 44 for moving the lateral portions 20, 22 so as to pass from a working configuration wherein the lateral portions 20, 22 are alongside and aligned with the central portion 12, to a folded configuration wherein the lateral portions 20, 22 are at least partially folded and overlapping the central portion 12.

The drive elements may be hydraulic and/or pneumatic drive motors, such as cylinders and respective pistons or stems of the hydraulic and/or pneumatic type.

The drive elements 44 may be operatively connected to the connection elements 32 and/or to the lateral portions 20, 22 so as to move the lateral portions 20, 22 in relation to said first and second hinge 36, 40, folding them at least partially onto the central portion 12.

According to certain embodiments, the first and the second hinge 36, 40 may be positioned at a first connection end 48 of arm 34 to the central portion 12.

According to certain embodiments, first drive elements 45 may be positioned at said first connection end 48 of arm 34 to the central portion 12 so as to control the rotation movements of the lateral portion 20, 22 in relation to the first and second hinge 36, 40.

Arm 34 in turn may be connected to the lateral portion 20, 22 at a second connection end 52 at which a third hinge 56 is positioned, defining a third rotation axis R''' parallel to the first rotation axis R', when head 4 is in a working configuration.

The second connection end 52 may be positioned between a centerline S of the lateral portion 20, 22 and said inner end 24 of the same lateral portion.

Arm 34 may be U-shaped so as to delimit a concave seat 60 facing the lateral portion 20, 22 and so as to permit the rotation of the lateral portion 20, 22 around the third rotation axis R''', said concave seat 60 housing at least partially the section of lateral portion 20, 22 included between the second connection end 52 and the inner end 24 of the lateral portion 20, 22, during the rotation of the latter around the third rotation axis R'''.

Arm 34 may be fitted with second drive elements 46 positioned at the second end 52 so as to move the lateral portion 20, 22 in relation to the third hinge 56.

According to a further embodiment, each lateral portion 20, 22 may be in turn composed of a pair of sections 64 alongside and hinged to each other in relation to a fourth hinge 68 defining a fourth rotation axis W parallel to the first rotation axis R' in a working configuration of head 4, it being possible to fold back the sections 64 on to each other.

The lateral portion 20, 22 may include drive elements (not shown) positioned on the lateral portion 20, 22 itself so as to allow the folding of sections 64 relative to said fourth hinge 68.

Sections 64 may have a substantially transverse dimension equal to half the transverse dimension of the lateral portion 20, 22.

The central portion 12 may have a transverse extension T less than or equal to a third of the total transverse extension V of head 4 in a working configuration.

According to certain embodiments, the lateral portions 20, 22 may be fitted with front tips 76 positioned frontally with respect to the sheller rollers 8 so as to intercept the cobs before the rollers, wherein said front tips 76 include a rear portion 80 facing roller 8, and a front portion 84, opposite the rear portion 80. In particular, the front portion 84 may be hinged to the rear portion 80 in relation to a tip axis 88 parallel to the main transversal direction Y-Y in a working configuration, so as to be able to overlap the front portion 84 on the rear portion 80 in a folded configuration of head 4. According to certain embodiments, the head may be fitted with drive elements for moving and folding the front tips 76 relative to the rear tips 80.

Methods for folding back a head for corn-shelling machines and/or combine harvesters according to the invention will now be described.

Head 4 may be positioned in a working configuration wherein the lateral portions 20, 22 are aligned in relation to the central portion 12 (FIGS. 1a-1c, 5a).

The lateral portions 20, 22 may be rotated around the first hinge 36, defining the first rotation axis R', so as to separate and raise the lateral portions 20, 22 in relation to the central portion 12 (FIGS. 2a-2c, 5b). Then, the lateral portions 20, 22 may be rotated around the second hinge 40 defining a second rotation axis R' perpendicular to the first rotation axis R', so as to rotate the lateral portions 20, 22 in a reciprocal approach towards a centerline plane M-M of the central portion 12 and to position them on a plane substantially perpendicular to said transversal direction Y-Y (FIGS. 4a-4d, 5e).

Figure 3C:
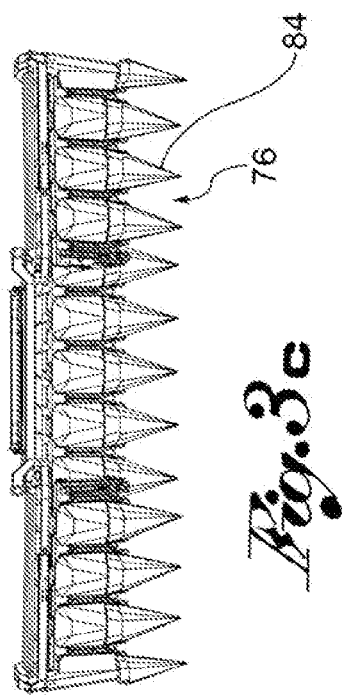
Figure 3A:
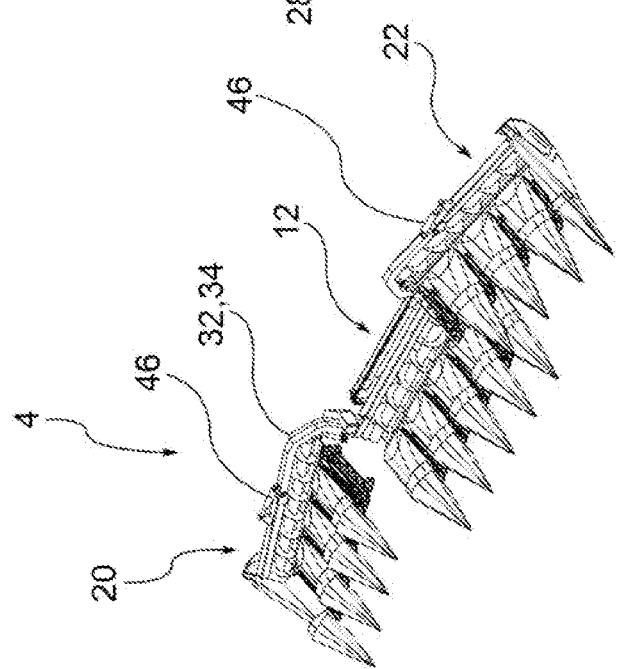
Figure 4A:
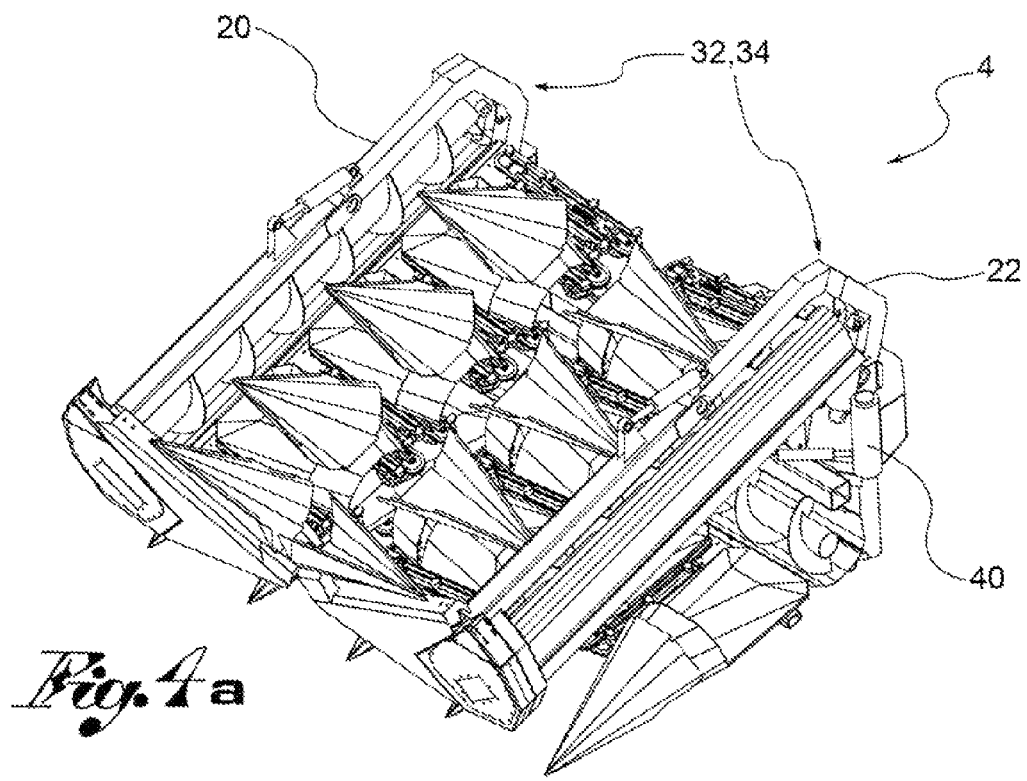
FIGS. 4a-4d, respectively, show a perspective, front, lateral and top plan view of a corn-shelling machine and/or combine harvester according to embodiments of the present invention, said machine being in final folded position.
Figure 4B:
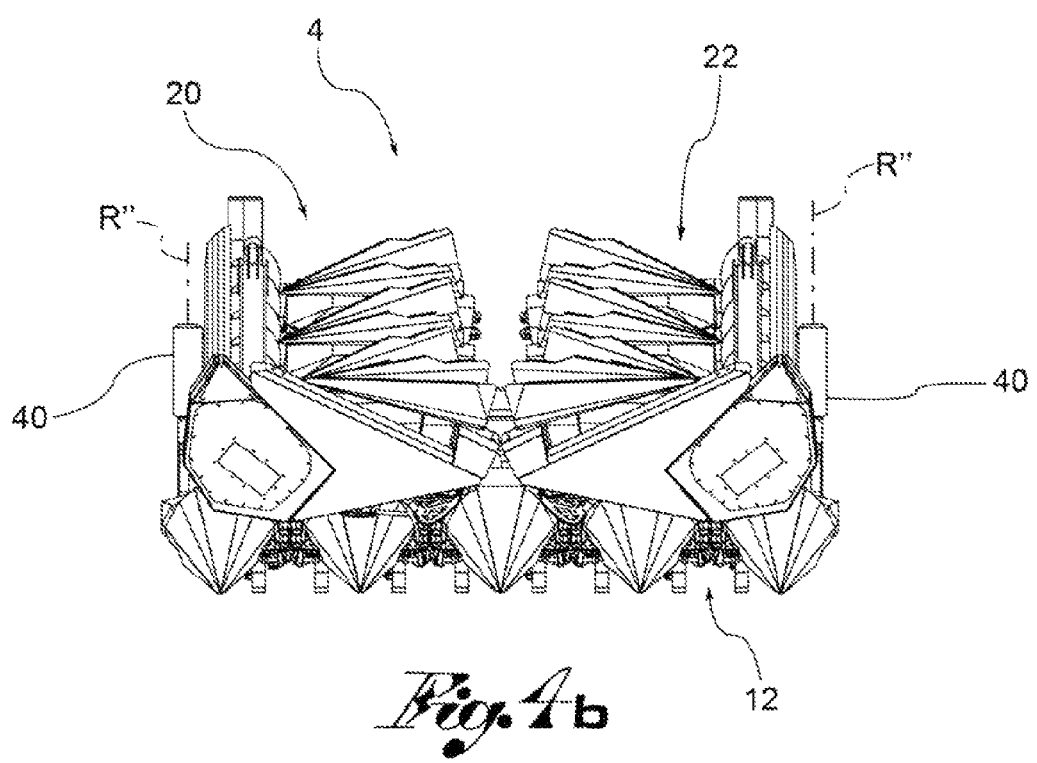
Figure 4D:
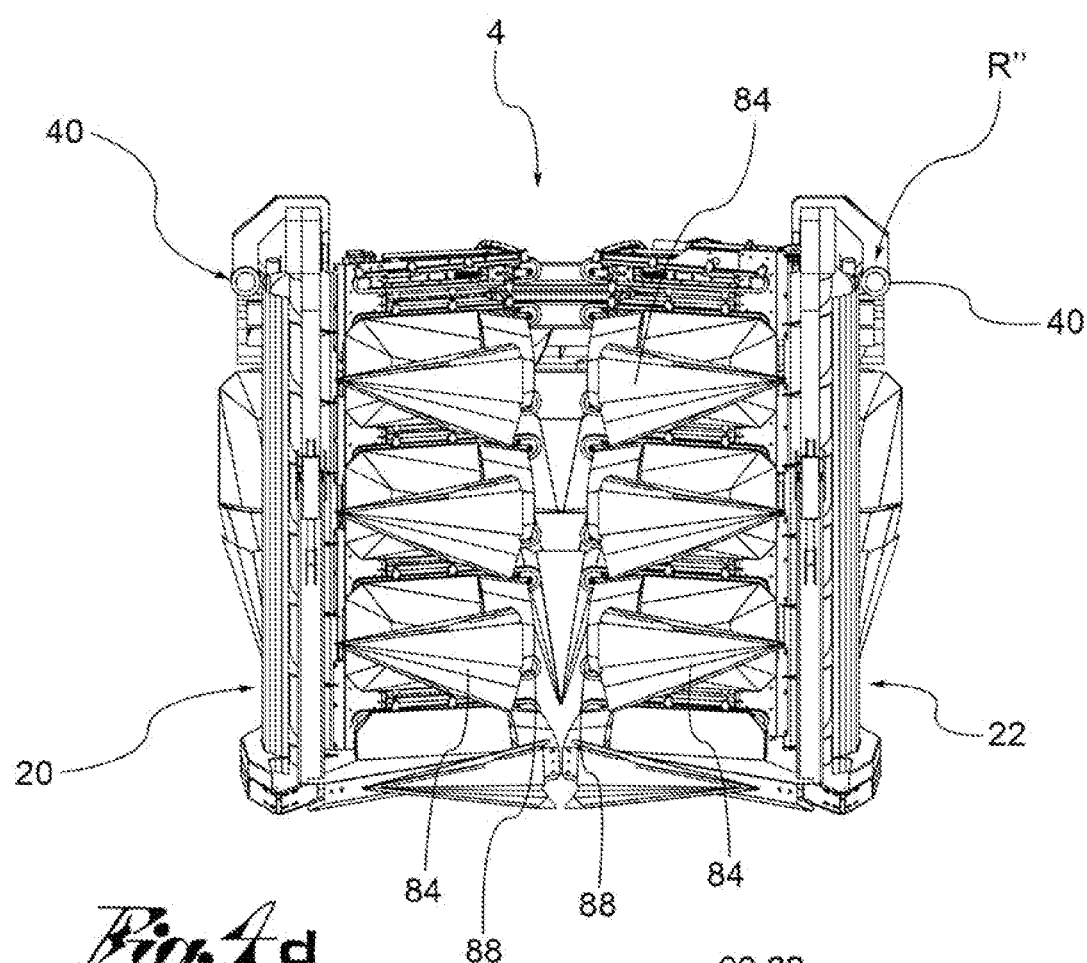
Figure 4C:
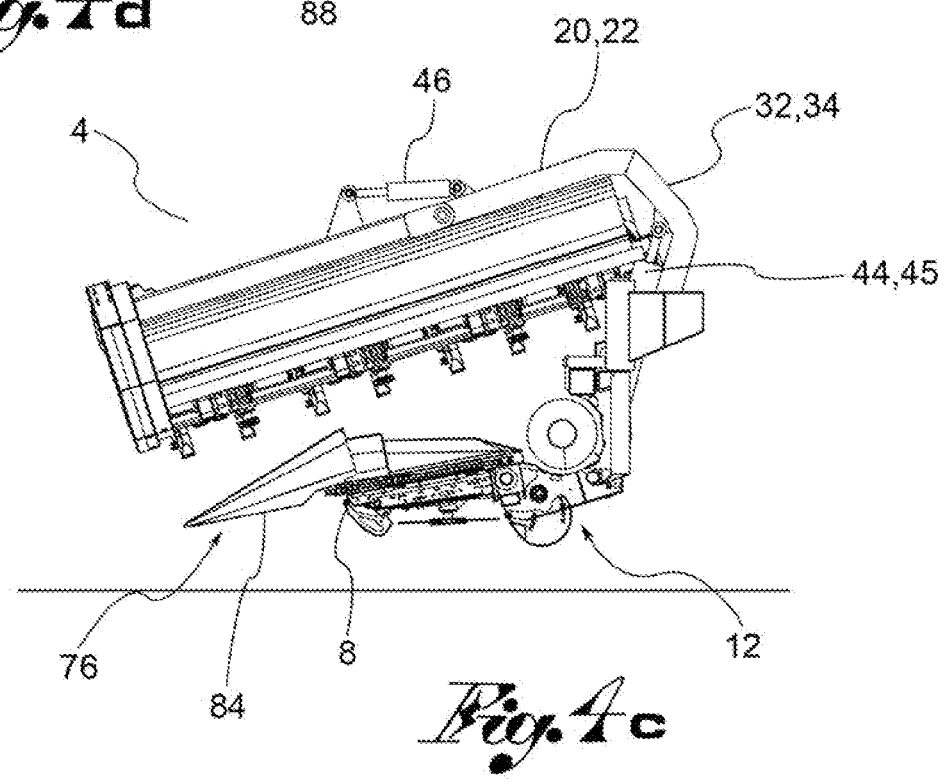

Arm 34 may be connected to the lateral portion 20, 22 at the second connection end 52 wherein, at said second connection end 52, a third hinge 56 may be positioned defining a third rotation axis R''' parallel to the first rotation axis R', when head 4 is in a working configuration. Arm 34 may be U-shaped so as to delimit a concave seat 60 facing the lateral portion 20, 22; the lateral portion 20, 22 then may be rotated around the third rotation axis R''', so that said concave seat 60 houses at least partially the section of lateral portion 20, 22 included between the second connection end 52 and the inner end 24 of the lateral portion 20, 22, during the rotation of the latter around the third rotation axis R''' (FIGS. 3a-3c; 5c).

The step of rotating the lateral portions 20, 22 around the third rotation axis R''' may be carried out before the step of rotating the lateral portions 20, 22 around the second rotation axis R".

Figure 5A:
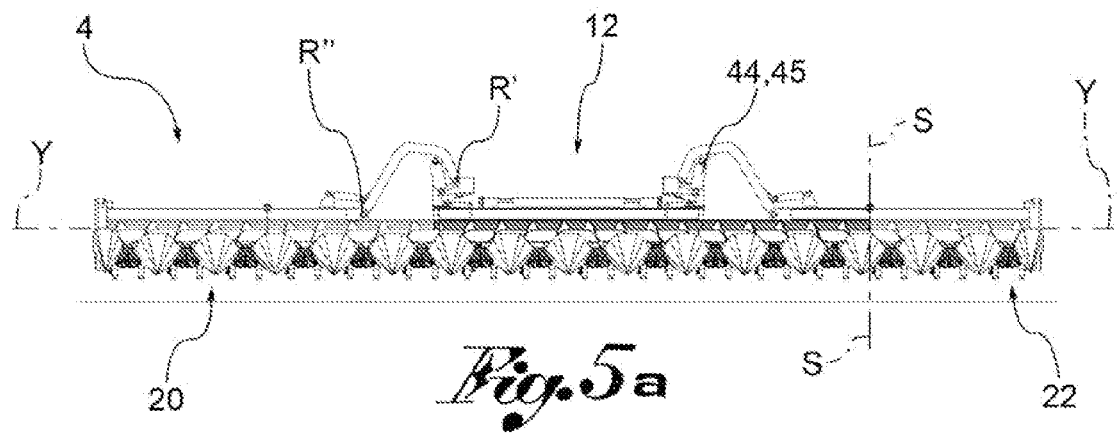
FIGS. 5a-5e show front views of the folding steps of a corn-shelling machine and/or combine harvester according to further embodiments of the present invention.
Figure 5B:
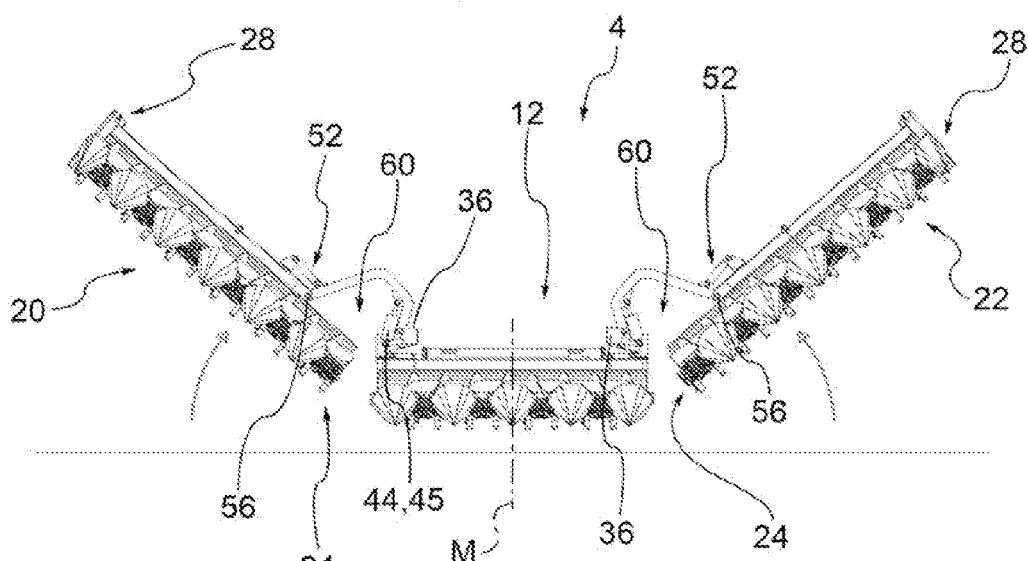
Figure 5C:
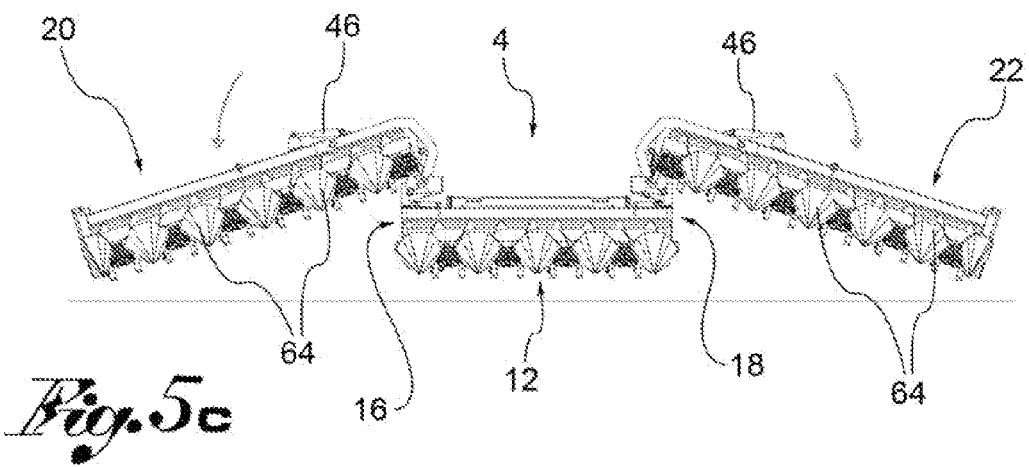
Figure 5D:
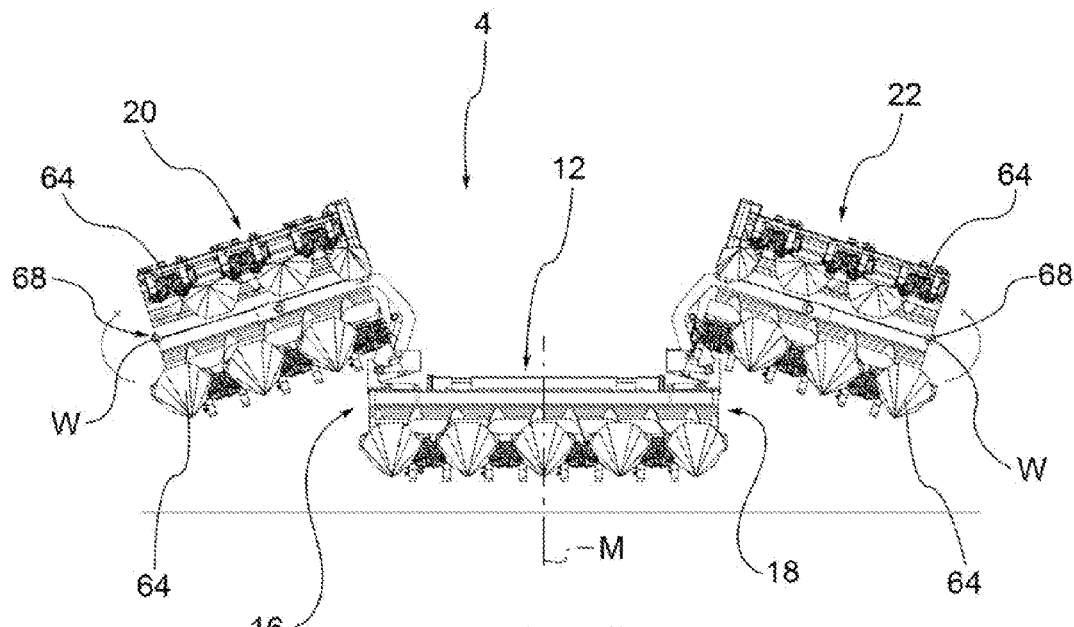
Figure 5E:
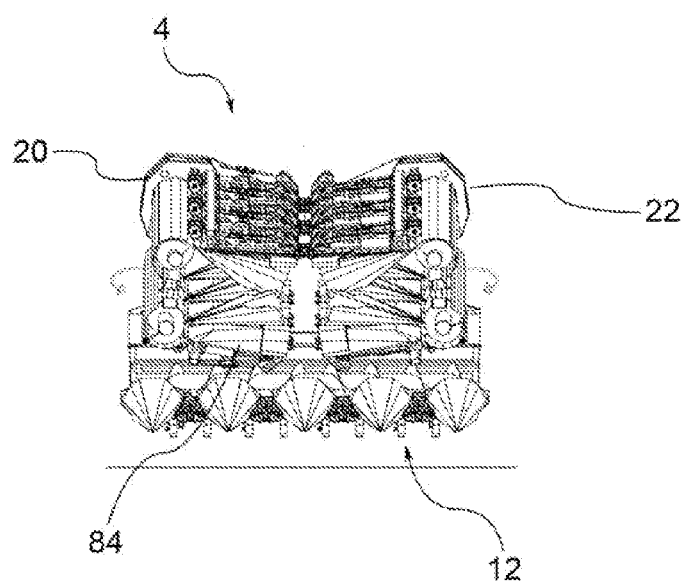

When head 4 is provided with lateral portions 20, 22 divided into two sections 64, it may be preferable in certain embodiments to fold sections 64 on themselves (FIG. 5d) after rotating the lateral portions 20, 22, in an extended configuration, around the third rotation axis R''' (FIG. 5c) and before rotating the same lateral portions 20, 22 around the second rotation axis R" (FIG. 5e).

Lateral portions 20, 22 also may be fitted with front tips 76 positioned frontally with respect to the sheller rollers 8 so as to intercept the cobs before the same rollers.

The front tips may be fitted with rear portion 80 and front portion 84; the folding steps may include rotating the front portion 84 so as to overlap it on the rear portion 80 in a folded configuration of head 4, said rotation of the front portion 84 being performed before the rotation of the lateral portions 20, 22 in a reciprocal approach towards the centerline plane M-M of the central portion 12 (FIGS. 4a-4d, 5e).

As can be understood from the description, corn-shelling machines and/or combine harvesters according to the invention overcome the many drawbacks of the prior art.

In fact, heads may be folded so as to have a total transversal dimension equal to about one third compared to the total transversal dimension in the operating condition.

The folding operation can occur in a quick and optionally automated manner so as not to require manual intervention.

Heads according to the invention therefore may be easily carried on a combine harvester while eliminating or reducing the problems associated with oversized loads. This simplifies the transport of the head which is easy and cost-effective.

The present invention allows for the folding and carrying of heads which include, for example, 17 front tips having a transversal dimension of more than 12 meters in an operating condition.

A person skilled in the art may make several changes and adjustments to corn-shelling machines and/or combine harvesters based on the present disclosure. Such changes and adjustments are intended to fall within the scope of protection defined herein.

What is claimed is:

1. A folding head for a corn-shelling machine or combine harvester suitable for performing the shelling of cobs comprising at least one sheller roller rotating in relation to a relative rotation axis and fitted with blades to pull a stalk of a corn on the cob plant downwards,
   the head comprising a central portion extending along the main transversal direction between opposite transversal ends and two lateral portions positioned on opposite sides to the central portion at each transversal end and aligned with the central portion in a working condition of the head,
   each lateral portion extending from an inner end, alongside the corresponding transversal end of the central portion in a working configuration, to an external end, opposite the inner end in relation to the transversal direction, in a working configuration,
   the head comprising drive elements for moving the lateral portions so as to pass from a working configuration wherein the lateral portions are alongside and aligned with the central portion, to a folded configuration wherein the lateral portions are at least partially folded and overlapping the central portion,
   wherein
   each lateral portion is operatively connected to the central portion by the interposition of connection elements comprising a relative arm which connects each lateral portion to the central portion,
   wherein the connection elements comprise a first hinge defining a first rotation axis parallel to the longitudinal direction of advancement of the head, so as to separate and raise the lateral portions in relation to the central portion, and comprising a second hinge defining a second rotation axis, perpendicular to the first rotation axis, so as to rotate the lateral portions in reciprocal approach towards a centerline plane of the central portion and to position them on a plane substantially perpendicular to said transversal direction,
   wherein said first hinges are separate from each other and each of the first hinges are located near a corresponding and opposite transversal end of the central portion, and wherein second hinges of the lateral portions are fixed with respect to the central portion.

2. The head of claim 1, wherein the drive elements are operatively connected to the connection elements or to the lateral portions so as to move the lateral portions in relation to said first and second hinge, folding them at least partially onto the central portion.

3. The head of claim 1, wherein the first and second hinge are positioned at a first connection end of the arm to the central portion.

4. The head of claim 1, wherein first drive elements are positioned at a first connection end of the arm to the central portion so as to control the rotation movements of the lateral portion in relation to the first and second hinge.

5. The head of claim 2, wherein the arm is connected to the lateral portion at a second connection end at which a third hinge is positioned defining a third rotation axis parallel to the first rotation axis, when the head is in a working configuration.

6. The head of claim 5, wherein said second connection end is positioned between a centerline of the lateral portion and said inner end of the same lateral portion.

7. The head of claim 5, wherein the arm is U-shaped so as to delimit a concave seat facing the lateral portion and so as to permit the rotation of the lateral portion around the third rotation axis, said concave seat housing at least partially the section of lateral portion included between the second connection end and the inner end of the lateral portion, during the rotation of the latter around the third rotation axis.

8. The head of claim 5, wherein the arm is fitted with second drive elements positioned at the second connection end so as to move the lateral portion in relation to the third hinge.

9. The head of claim 1, wherein each lateral portion is in turn composed of a pair of sections alongside and hinged to each other in relation to a fourth hinge defining a fourth rotation axis parallel to the first rotation axis in a working configuration of the head, it being possible to fold back the sections on to each other.

10. The head of claim 9, wherein said sections have a transversal dimension equal to about half the transversal dimension of the lateral portion.

11. The head of claim 1, wherein the central portion has a transversal extension less than or equal to about a third of the total transversal extension of the head in a working configuration.

12. The head of claim 1, wherein the lateral portions are fitted with front tips positioned frontally with respect to the sheller rollers so as to intercept the cobs before the rollers, wherein said front tips comprise a rear portion facing the roller, and a front portion, opposite the rear portion, the front portion being hinged to the rear portion in relation to a tip axis parallel to the main transversal direction in a working configuration, so as to be able to overlap the front portion on the rear portion in a folded configuration of the head.

* * * * *